United States Patent [19]

Braukmann

[11] 4,013,089
[45] Mar. 22, 1977

[54] BACK FLOW PREVENTER VALVE

[75] Inventor: Heinz Werner Braukmann, Willowdale, Canada

[73] Assignee: Braukmann Armaturen AG, Rothrist, Switzerland

[22] Filed: Sept. 17, 1975

[21] Appl. No.: 614,246

[52] U.S. Cl. .............................................. 137/218
[51] Int. Cl.² ......................................... E03C 1/10
[58] Field of Search ................................... 137/218

[56] References Cited
UNITED STATES PATENTS

| | | | |
|---|---|---|---|
| 3,818,929 | 6/1974 | Braukmann | 137/218 |
| 3,905,382 | 9/1975 | Waterston | 137/218 |

*Primary Examiner*—Alan Cohan
*Assistant Examiner*—Gerald A. Michalsky
*Attorney, Agent, or Firm*—William T. Howell

[57] ABSTRACT

A back flow preventer valve has an annular resilient diaphragm secured to the valve body between the inlet and outlet valves; the diaphragm supports an annular wall member which closes off a vent. In the event of back flow, the pressure on the membrane raises the annular wall from the vent to open the latter and the back flow does not cause contamination. The feature of the valve is a seal formed by the valve body and the annular wall engaging in the event of diaphragm failure, thus ensuring that the back flow travels through the vent.

4 Claims, 1 Drawing Figure

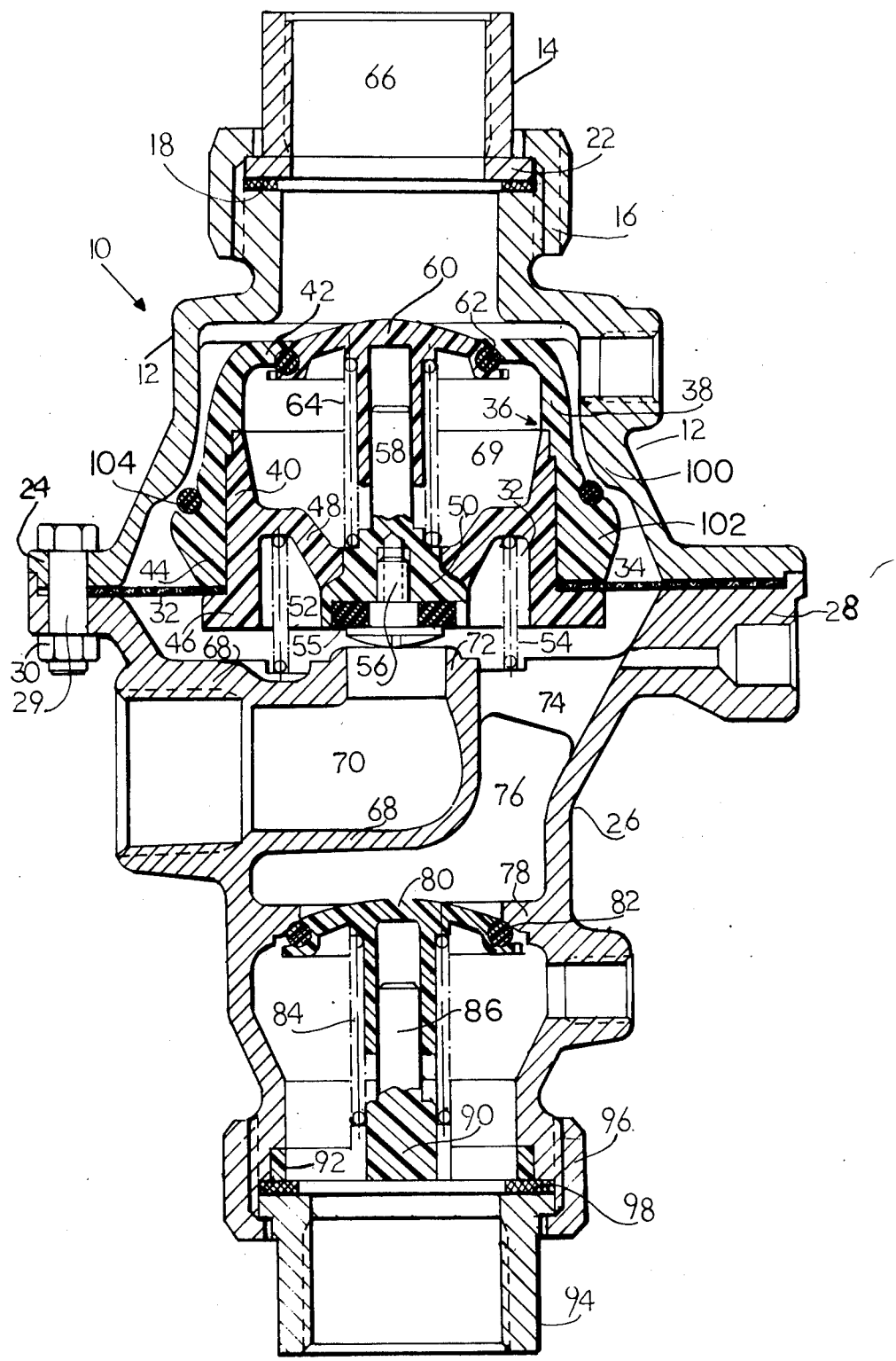

BACK FLOW PREVENTER VALVE

FIELD OF THE INVENTION

This invention relates to backflow preventer valves wherein backflow in the valve due to an increase in pressure downstream is prevented from contaminating the supply line by providing venting means which is normally closed by a relief valve until backflow occurs.

More particularly the invention relates to a combination backflow preventer and anti-siphon valve utilising a relief valve formed of a resilient annular diaphragm secured to the valve wall; the diaphragm is arranged to move and thereby open the venting means if pressure drops upstream, thus preventing a vacuum downstream of the valve.

PRIOR ART

The operation of a backflow preventer valve of this type is described in U.S. Pat. No. 3,818,929 where the valve body contains a diaphragm supporting a perforated cup-like member which includes a check valve. Downstream of the cup-like member in the valve body chamber is a vent passage which has a seat for the cup-like member; below the vent passage is another check valve. In normal operation both check valves open and the flow from the inlet is through the cup-like member and then to the outlet.

In the event of backflow, the pressure exerted on the diaphragm causes it to lift the cup-like member away from its seat on the vent passage and hence the backflow is diverted thereto.

Other patents on valves of this nature have been granted viz U.S. Pat. No. 3,171,423 and it shows a valve which operates on the same principle i.e. a flexible diaphragm supporting an annular wall which provides a seat for a check valve with the annular wall seating on the valve body to close off the vent passages.

The common requirement of all such preventer valves is a flexible diaphragm but this may be oscillated in use to a point where failure occurs in which event backflow contamination will take place and the preventer purpose of the valve will not be achieved.

It is an object of the invention to provide a backflow preventer valve of the flexible diaphragm type wherein, on failure of the diaghragm, backflow contamination is prevented.

SUMMARY OF THE INVENTION

The invention consists in providing upstream of the diaphragm a closure valve construction on the annular wall which will seat against the valve body to which the diaphragm is secured. In the event of diaphragm failure the closure valve will seal off the backflow and the normal flow will be diverted to the vent passage.

BRIEF DESCRIPTION OF THE DRAWINGS

The invention will now be described in relation to the accompanying drawing which shows a vertical axial cross sectional view of a backflow preventer valve constructed in accordance with the invention.

DESCRIPTION OF A PREFERRED EMBODIMENT

The valve includes an upstream hollow body part generally denoted by the numeral 10 having a wall 12 attached to a female threaded upstream connector sleeve 14 through a threaded ring 16, the outer end of which bears against a shoulder 22 on the sleeve 14. A gasket 18 provides a seal. The wall 12 terminates in a flange 24.

The valve has a downstream annular body 26 provided with a flange 28. The wall 12 of the hollow body is secured to the annular body 26 by means of bolts 29 which extend through the flanges 24 and 28, a nut 30 is threaded on to each bolt 29.

The outer portion of an annular flexible diaphragm 32 is secured between the flanges 24 and 28 in sealed relationship. The annular diaphragm 32 extends inward into the chamber 34 formed by the connection of the wall 12 and the annular body 26.

Located in the chamber 34 is a cup-like member generally denoted by the numeral 36 formed of an upper wall 38 and a lower mating wall 40. The upper wall 38 has an opening with an overhang 42. The lower end of the wall 38 terminates in a shoulder 44.

The lower end of the wall 40 terminates in a flange 46 which engages the shoulder 44 of the wall 38 to provide a means for securing the inner portion of the annular flexible diaphragm 32 as illustrated.

Extending inwards from an intermediate location in the wall 40 are downwardly depending ribs 48 which terminate in a centrally disposed portion 50. The recess 52 formed by the downwardly depending ribs 48 locates the upper end of a balancing spring 54.

The underside of the central portion 50 is recessed to accommodate a valve disc 55 preferably made of a resilient material and held in place by the head of a pin 56 located in the central position 50 as shown.

The central portion 50 has an upwardly extending arm 58 which carries a mushroom shape check valve disc 60 having a sealing ring 62 which engages with the overhang 42 of the wall 38 through the action of a conventional biasing spring 64.

When pressure is exerted on the check valve disc 60 due to flow through the inlet 66, it moves against the spring 64, and the liquid then flows into the cup-like member 36 and through the openings between the ribs 48; the diaphragm 32 prevents flow around the cuplike member 36.

The annular body 26 has a wall 68 which provides a vent passage 70. The wall 68 curves upward as shown to provide a valve seat 72 for engagement with the valve disc 55 on the underside of the cup-like member 36 when flow is normal.

The annular body 26 has a series of ribs 74 which provide passageways for the fluid into a lower chamber 76 of the annular body 26. The wall 68 and the ribs 74 are recessed as illustrated to provide location for the lower end of the balancing spring 54.

The lower chamber 76 has a constriction 78 which provides a seat for another mushroom shaped check valve disc 80 provided with a sealing ring 82. A biasing spring 84 surrounds a circular arm 86 which carries the mushroom shaped check valve disc 80. The arm 86 is located in a centrally disposed boss 90 connected by ribs 92 to the annular body 26.

The annular body 26 is connected to an outlet connector sleeve 94 by a ring 96, the connector is provided with a sealing gasket 98.

The wall 12 of the hollow body part 10 has a circumferential inwardly extending tapered abutment 100 located upstream of the flexible diaphragm 32. The upper wall 38 of the cup-like member 36 has a circumferential outwardly extending abutment 102 also located upstream of the flexible diaphragm 32 which abutment 96 is recessed to carry a sealing ring 104. The two abutments 100 and 102 are dimensioned so that on contact the sealing ring 104 provides a seal.

As long as the flexible diaphragm 32 remains intact, back pressure simply lifts the cup-like member 36 away from its sealing relation with the seat 72 and the flow is through the vent passage 70. However in the event of diaphragm failure the balancing spring 54 will carry the cup-like member 36 upward until the abutments 100 and 102 make contact in which event flow will always be through the vent passage 70 and back pressure action will not lead to flow in the direction of the inlet.

It will be appreciated that the sealing means contributed by the abutments 100 and 102 is only one form; for instance flanges could be utilised to provide a seal.

I claim:

1. A backflow preventor valve having an inlet and an outlet comprising a hollow valve body, an annular resilient membrane in said valve body, the outer portion of said membrane being secured to said valve body, a rigid annular wall member securing the inward portion of said resilient membrane, said annular wall being spaced from said valve body, an inlet valve sealing against said rigid annular wall, an outlet valve downstream of said resilient membrane, vent means in said valve body intermediate of said resilient membrane and said outlet valve, said rigid annular wall member being adapted to close off said vent means on flow from said inlet to said outlet, a spring biasing said rigid annular wall member against said resilient membrane towards said inlet and spaced apart sealing means of said rigid annular wall and said valve body upstream of said resilient membrane, one of said sealing means being resilient, said sealing means engaging on failure of said membrane due to the biasing action of said spring whereby said vent means remains open to receive any flow from said inlet or backflow from said outlet.

2. A backflow preventer valve according to claim 1 wherein said sealing means is a circumferential abutment on the inside of said valve body and a cooperating circumferential abutment on the outside of said rigid annular wall member.

3. A backflow preventor valve according to claim 1 wherein said sealing means is spaced from said resilient membrane.

4. A backflow preventor valve according to claim 1 wherein said rigid annular wall member is formed of a co-acting upper and lower part between which said resilient membrane is directly secured, said sealing means on said rigid annular wall member being positioned on said upper part.

* * * * *